United States Patent
Lee et al.

(10) Patent No.: US 8,251,860 B2
(45) Date of Patent: Aug. 28, 2012

(54) PLANETARY GEAR SET

(75) Inventors: Hyun Ku Lee, Seoul (KR); Wang Kweon Lee, Hwaseong (KR); Moosuk Kim, Hwaseong (KR); Sangik Ryu, Seongman (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 747 days.

(21) Appl. No.: 12/132,142

(22) Filed: Jun. 3, 2008

(65) Prior Publication Data

US 2009/0156353 A1    Jun. 18, 2009

(30) Foreign Application Priority Data

Dec. 14, 2007    (KR) ........................ 10-2007-0131657

(51) Int. Cl.
*F16H 57/08*    (2006.01)

(52) U.S. Cl. ........................................ 475/331; 475/183

(58) Field of Classification Search .................. 475/183, 475/331

See application file for complete search history.

(56) References Cited

U.S. PATENT DOCUMENTS

| | | | | |
|---|---|---|---|---|
| 1,425,172 | A * | 8/1922 | Cameron-Cowburn | 475/183 |
| 3,245,286 | A * | 4/1966 | Hewko | 475/114 |
| 3,348,837 | A * | 10/1967 | Bolza-Schuncmann | 493/431 |
| 3,527,121 | A * | 9/1970 | Moore | 475/338 |
| 5,842,946 | A * | 12/1998 | Ichiki | 475/252 |
| 6,743,148 | B2 * | 6/2004 | Hayabuchi et al. | 475/331 |
| 7,014,436 | B2 * | 3/2006 | Klassen | 418/170 |
| 7,033,301 | B2 * | 4/2006 | Kimes | 475/340 |
| 7,297,086 | B2 * | 11/2007 | Fox | 475/331 |

* cited by examiner

*Primary Examiner* — Ha D. Ho

(74) *Attorney, Agent, or Firm* — Morgan, Lewis & Bockius LLP

(57) ABSTRACT

A planetary gear set includes: a sun gear, a plurality of planetary gears externally meshed with the sun gear, and a carrier that interconnects the plurality of planetary gears such that the plurality of planetary gears revolve around a exterior circumference of the sun gear, and an arrangement of the plurality of planetary gears is rotationally non-symmetrical.

18 Claims, 2 Drawing Sheets

PLANETARY GEAR SET

CROSS-REFERENCE TO RELATED APPLICATION

This application claims priority to and the benefit of Korean Patent Application No. 10-2007-0131657 filed in the Korean Intellectual Property Office on Dec. 14, 2007, the entire contents of which are incorporated herein by reference.

BACKGROUND OF THE INVENTION (a) Field of the Invention

The present invention relates to an automatic transmission. More particularly, the present invention relates to a planetary gear set used in an automatic transmission.

(b) Description of the Related Art

A typical automatic transmission employs a planetary gear set. The planetary gear set includes a sun gear, pinion gears, a ring gear, and a carrier that carries the pinion gears.

While a vehicle is driven, the automatic transmission frequently changes gears, and power interaction between the sun, pinion, and ring gears also frequently changes. When the sun, pinion, and ring gears or an arrangement thereof is not precisely designed, vibration or noise may be increased during shifting of the gears.

The above information disclosed in this Background section is only for enhancement of understanding of the background of the invention and therefore it may contain information that does not form the prior art that is already known in this country to a person of ordinary skill in the art.

SUMMARY OF THE INVENTION

Embodiments of the present invention provide a planetary gear set having advantages of reduced vibration and/or noise.

An exemplary embodiment of the present invention provides a planetary gear set of a transmission of a vehicle that includes: a sun gear; a first planetary gear that is externally meshed with the sun gear; a second planetary gear that is externally meshed with the sun gear and is away from the first planetary gear by a first angular spacing around the sun gear; a third planetary gear that is externally meshed with the sun gear and is away from the second planetary gear by a second angular spacing larger than the first angular spacing around the sun gear; and a carrier that interconnects the first, second, and the third planetary gears.

The first angular spacing may be smaller than 120°, and the second angular spacing may be greater than 120°.

The exemplary planetary gear may further include: a fourth planetary gear that is externally meshed with the first planetary gear; a fifth planetary gear that is externally meshed with the second planetary gear; and a sixth planetary gear that is externally meshed with the third planetary gear, wherein the fourth, fifth, and sixth planetary gears are also interconnected by the carrier.

The second angular spacing may be 120.05°.

An exemplary embodiment of the present invention provides a planetary gear set of a transmission of a vehicle that includes: a sun gear; a plurality of planetary gears externally meshed with the sun gear; and a carrier that interconnects the plurality of planetary gears such that the plurality of planetary gears revolve around a exterior circumference of the sun gear, wherein an arrangement of the plurality of planetary gears is arranged rotationally non-symmetrical.

A plurality of angular differences between adjacent planetary gears may form a plurality of values.

The plurality of planetary gears may include three planetary gears of first, second, and third planetary gears.

An angular difference of at least one pair of adjacent planetary gears may be greater than 120°.

The angular difference of the at least one pair of adjacent planetary gears may be 120.05°.

An angular difference of at least one pair of adjacent planetary gears may be less than 120°.

The angular difference of the at least one pair of adjacent planetary gears may be 119.95°.

A first angular difference between a first pair of adjacent planetary gears may be greater than 120°, and a second angular difference between a second pair of adjacent planetary gears may be less than 120°.

The first angular difference between the first pair of adjacent planetary gears may be 120.05°.

The second angular difference between the second pair of adjacent planetary gears may be 119.95°.

A third angular difference between a third pair of adjacent planetary gears may be 120°.

The first angular difference may be 120.05° and the second angular difference may be 119.95°.

The exemplary planetary gear set may further include a plurality of outer planetary gears that are externally meshed with the plurality of planetary gears respectively.

Figure 1:
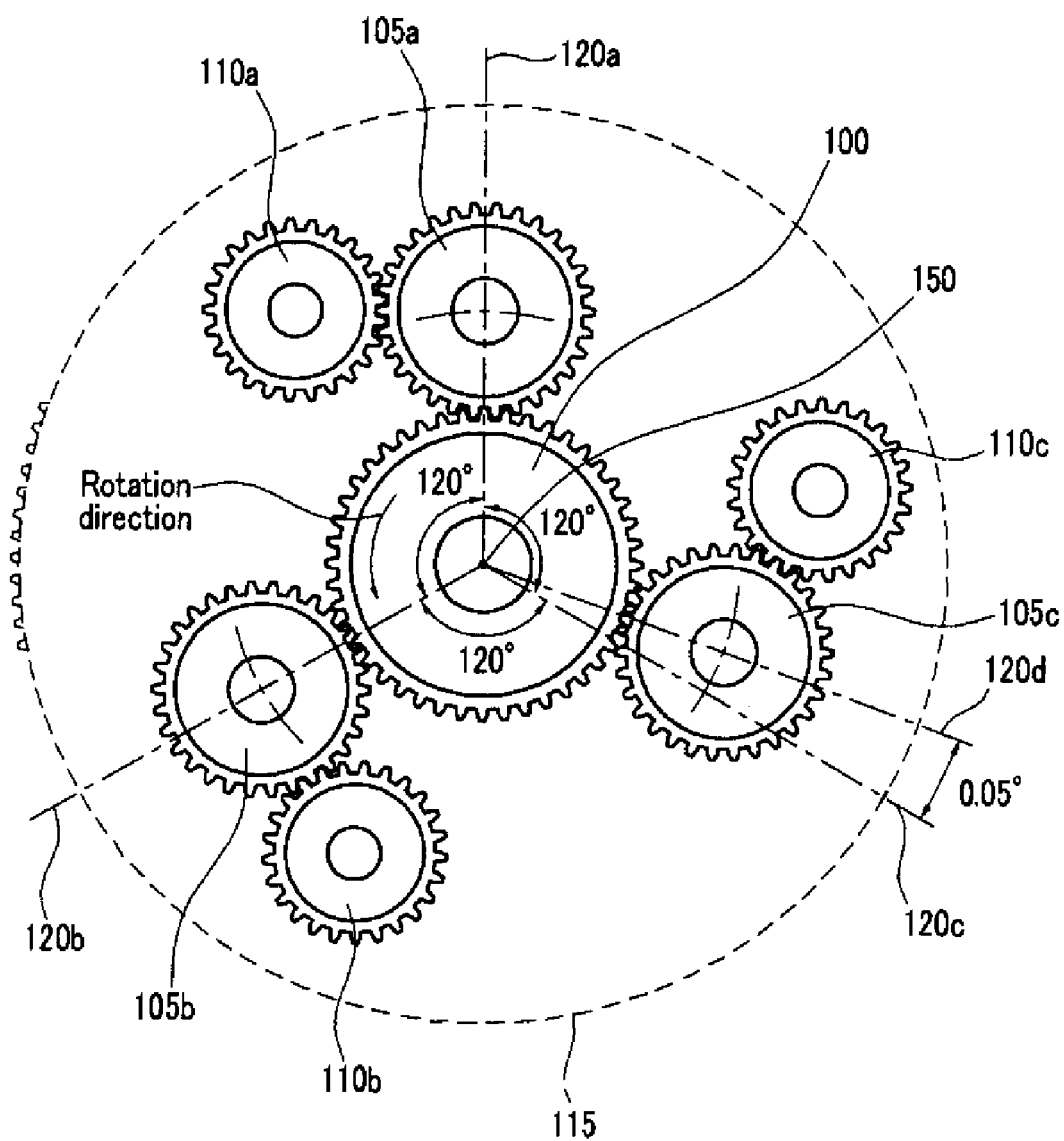
FIG. 1 is a schematic diagram of a planetary gear set according to an exemplary embodiment of the present invention.

In the figures, reference numbers refer to the same or equivalent parts of the present invention throughout the several figures of the drawing.

REPRESENTATIVE REFERENCE NUMERALS

100: sun gear
105a, 105b, 105c: planetary gear
110a, 110b, 110c: planetary gear
115: carrier

DETAILED DESCRIPTION OF THE EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims. As those skilled in the art would realize, the described embodiments may be modified in various different ways, all without departing from the spirit or scope of the present invention.

Referring to FIG. 1, a planetary gear set includes a sun gear 100 and inner planetary gears of a first planetary gear 105a, a second planetary gear 105b, and a third planetary gear 105c.

The first, second, and third planetary gears 105a, 105b, and 105c are externally meshed with the sun gear 100, respectively.

In addition the exemplary planetary gear set includes outer planetary gears of a fourth planetary gear 110a, a fifth planetary gear 110b, and a sixth planetary gear 110c that are externally meshed with the first, second, and third planetary gears, respectively. The first to sixth planetary gears 105a, 105b, 105c, 110a, 110b, and 110c are assembled to a carrier 115 so that they may revolve around the sun gear 100 with a fixed spatial configuration.

Conventionally, planetary gears are symmetrically disposed. That is, planetary gears are disposed with a uniform angular difference between adjacent planetary gears.

However, according to an exemplary embodiment, an arrangement of the first to third planetary gears 105a, 105b, and 105c is rotationally non-symmetrical. In more detail, a plurality of angular differences between adjacent planetary gears form a plurality of different values.

For example, the second planetary gear 105b is angularly away from the first planetary gear 105a by 120° around the sun gear 100. However, the third planetary gear 105c is angularly away from the second planetary gear 105b by 120.05° around the sun gear 100. Thus, the third planetary gear 105c is angularly away from the first planetary gear 105a by 119.95°. That is, according to an exemplary embodiment of the present invention, three different values of 120°, 120.05°, and 119.95° are formed between adjacent planetary gears.

When an entire angle of 360° is divided into three uniform angles, three radial reference lines 120a, 120b, and 120c shown in FIG. 1 may be formed with a uniform angular difference of 120° around a rotation center 150 of the sun gear 100.

A rotation center of the first planetary gear 105a lies on a first reference line 120a, and a rotation center of the second planetary gear 105b lies on a second reference line 120b.

However, a rotation center of the third planetary gear 105c does not lie on a third reference line 120c but lies on a fourth reference line 120d that is offset from the third reference line 120c by 0.05°.

Considering that teeth of the sun gear 100 and the planetary gears 105a, 105b, and 105c have finite size and the numbers of the teeth thereof are also finite, the sun gear 100 may not always maintain tight contact with all the three planetary gears 105a, 105b, and 105c during the operation of the planetary gear set when the planetary gears 105a, 105b, and 105c are arranged with exactly the same angular spacing.

Therefore, by disposing one or more planetary gears slightly offset from a geometrically symmetrical position, the sun gear 100 may better maintain the contact with the planetary gears in the average. That is, if the contact with one planetary gear becomes looser, the contact with another planetary gear may become tighter so as to compensate the loosened contact. In this way, the average contacting strength of all the planetary gears 105a, 105b, and 105c with the sun gear 100 may be better maintained, and thus, vibration, noise, and backlash of an automatic transmission may be reduced.

Figure 2:
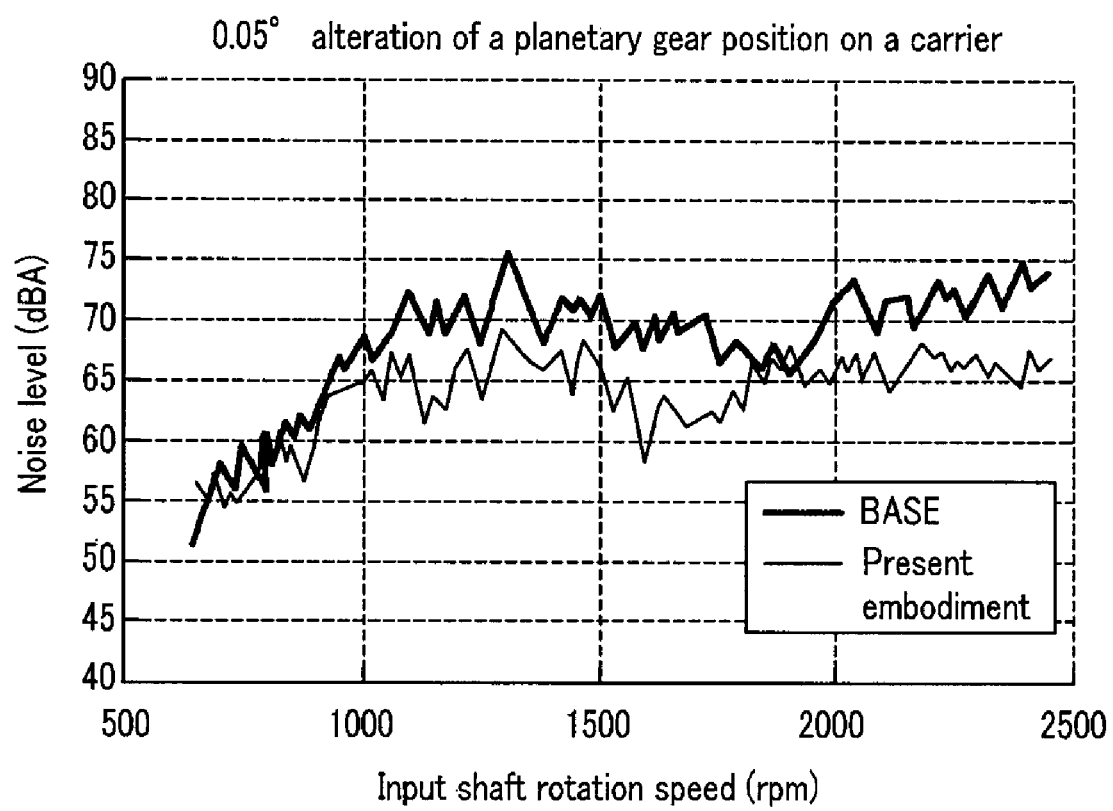
FIG. 2 is a chart showing reduction of noise obtained by a planetary gear set according to an exemplary embodiment of the present invention.

FIG. 2 illustrates noise reduction obtained by a planetary gear set according to an exemplary embodiment of the present invention. As shown therein, the horizontal axis denotes rotation speed and the vertical axis denotes noise level. Broken line represents noise level of a conventional planetary gear set, and the solid line represents noise level of a planetary gear set according to an exemplary embodiment of the present invention. Thus, as shown in FIG. 2, noise is decreased throughout an overall range by altering the planetary gear position on the carrier, by more than 5 dBA for a low speed range of 1,000-2,000 rpm.

In the above description, a double pinion planetary gear set is taken as an example for an embodiment of the present invention. However, it is obvious that the present invention is not limited thereto, since the spirit of the present invention may easily be applied to a single pinion planetary gear set by a person of ordinary skill in the art.

Furthermore, in the above description, a simple planetary gear set is taken as an example for an embodiment of the present invention. However, it is obvious that the present invention is not limited thereto, since the spirit of the present invention may easily be applied to a compound pinion planetary gear set by a person of ordinary skill in the art.

Furthermore, in the above description, a planetary gear set having three inner/outer planetary gears is taken as an example for an embodiment of the present invention. However, it is obvious that the present invention is not limited thereto, since the spirit of the present invention may easily be applied to a planetary gear set having four or more planetary gears by a person of ordinary skill in the art.

Furthermore, in the above description, angular differences have a deviation of 0.05°. However, it is obvious that the present invention is not limited thereto. A specific value of the deviation may be altered by a person or ordinary skill taking into account of the number of pinion gears, the number of teeth for the sun gear and the pinion gears, etc. While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A planetary gear set of a transmission of a vehicle, comprising:
   a sun gear concentrically rotating at an axis fixedly positioned at a center of the sun gear, wherein an instantaneous rotation center of the sun gear is positioned at the fixed axis;
   a first planetary gear externally meshed with the sun gear;
   a second planetary gear externally meshed with the sun gear and disposed away from the first planetary gear by a first angular spacing around the sun gear;
   a third planetary gear externally meshed with the sun gear and disposed away from the second planetary gear by a second angular spacing larger than the first angular spacing around the sun gear; and
   a carrier that interconnects the first, second, and the third planetary gears;
   wherein the first, second and third planetary gears are only planetary gears that are externally meshed with the sun gear.

2. The planetary gear set of claim 1, wherein the first angular spacing is smaller than 120°, and the second angular spacing is greater than 120°.

3. The planetary gear set of claim 2, wherein:
   a fourth planetary gear externally meshed with the first planetary gear;
   a fifth planetary gear externally meshed with the second planetary gear; and
   a sixth planetary gear externally meshed with the third planetary gear,
   wherein the fourth, fifth, and sixth planetary gears are also interconnected by the carrier.

4. The planetary gear set of claim 2, wherein the second angular spacing is 120.05°.

5. A planetary gear set, comprising:
a sun gear rotating concentrically at a fixed axis fixedly positioned at a center of the sun gear wherein an instantaneous rotation center of the sun gear is positioned at the fixed axis;
a plurality of planetary gears externally meshed with the sun gear; and
a carrier that interconnects the plurality of planetary gears such that the plurality of planetary gears revolve around an exterior circumference of the sun gear,
wherein the plurality of planetary gears are only planetary gears that are externally meshed with the sun gear and an arrangement of the plurality of planetary gears is arranged rotationally non-symmetrical.

6. The planetary gear set of claim 5, wherein a plurality of angular differences between adjacent planetary gears form a plurality of values.

7. The planetary gear set of claim 6, wherein the plurality of planetary gears comprises three planetary gears of first, second, and third planetary gears.

8. The planetary gear set of claim 7, wherein an angular difference of at least one pair of adjacent planetary gears is greater than 120°.

9. The planetary gear set of claim 8, wherein the angular difference of the at least one pair of adjacent planetary gears is 120.05°.

10. The planetary gear set of claim 7, wherein an angular difference of at least one pair of adjacent planetary gears is less than 120°.

11. The planetary gear set of claim 10, wherein the angular difference of the at least one pair of adjacent planetary gears is 119.95°.

12. The planetary gear set of claim 7, wherein:
a first angular difference between a first pair of adjacent planetary gears is greater than 120°; and
a second angular difference between a second pair of adjacent planetary gears is less than 120°.

13. The planetary gear set of claim 12, wherein the first angular difference between the first pair of adjacent planetary gears is 120.05°.

14. The planetary gear set of claim 12, wherein the second angular difference between the second pair of adjacent planetary gears is 119.95°.

15. The planetary gear set of claim 12, wherein a third angular difference between a third pair of adjacent planetary gears is 120°.

16. The planetary gear set of claim 12, wherein the first angular difference is 120.05° and the second angular difference is 119.95°.

17. The planetary gear set of claim 7, wherein:
a fourth planetary gear externally meshed with the first planetary gear;
a fifth planetary gear externally meshed with the second planetary gear; and
a sixth planetary gear externally meshed with the third planetary gear,
wherein the fourth, fifth, and sixth planetary gears are also interconnected by the carrier.

18. The planetary gear set of claim 5, wherein a plurality of outer planetary gears externally meshed with the plurality of planetary gears respectively.

* * * * *